United States Patent [19]

Giese

[11] 4,002,858
[45] Jan. 11, 1977

[54] AUDIO PROGRAM SWITCHING APPARATUS

[76] Inventor: Edwin G. Giese, 1008 E. Fairy Chasm Road, Milwaukee, Wis. 53217

[22] Filed: Dec. 19, 1974

[21] Appl. No.: 534,163

[52] U.S. Cl. ............... 179/100.1 C; 179/100.1 PS; 360/12; 360/79
[51] Int. Cl.² ...................................... G11B 31/00
[58] Field of Search ...................... 360/12, 79, 80; 179/100.1 C, 100.1 PS, 100.1 R

[56] References Cited

UNITED STATES PATENTS

| | | | |
|---|---|---|---|
| 2,068,106 | 1/1937 | Horn et al. | 179/100.1 C |
| 2,787,669 | 4/1957 | Flan et al. | 179/100.1 R |
| 2,811,588 | 10/1957 | Julie | 179/100.1 R |
| 2,834,840 | 5/1958 | Flan et al. | 179/100.1 C |
| 3,493,681 | 2/1970 | Richards | 179/100.1 C |
| 3,644,682 | 2/1972 | Parilla | 360/12 |
| 3,775,569 | 11/1973 | Lougeay et al. | 179/100.1 C |
| 3,825,947 | 7/1974 | Rubin et al. | 179/100.1 C |

Primary Examiner—Raymond F. Cardillo, Jr.
Attorney, Agent, or Firm—Andrus, Sceales, Starke & Sawall

[57] ABSTRACT

A continuous primary audio program is periodically interrupted and a programmable source having a secondary program is periodically operated by an automatic electrical control in response to a control signal having a frequency outside of the audio frequency range and supplied by the secondary source. A sensing circuit selectively operates as a resonant amplifier and responds to the control signal to de-activate the secondary program and reinstate the primary program while further initiating a timing sequence by a timing circuit. Cyclic operation is provided by the timing circuit which functions to operatively attenuate the primary program and operate the secondary program after a predetermined duration of time following the control signal. Common circuitry is employed to program the secondary source by converting the resonant amplifier to an oscillator which operates with a selectively supplied source signal of a predetermined duration to provide an oscillatory output supplying the control signal to the secondary source.

4 Claims, 1 Drawing Figure

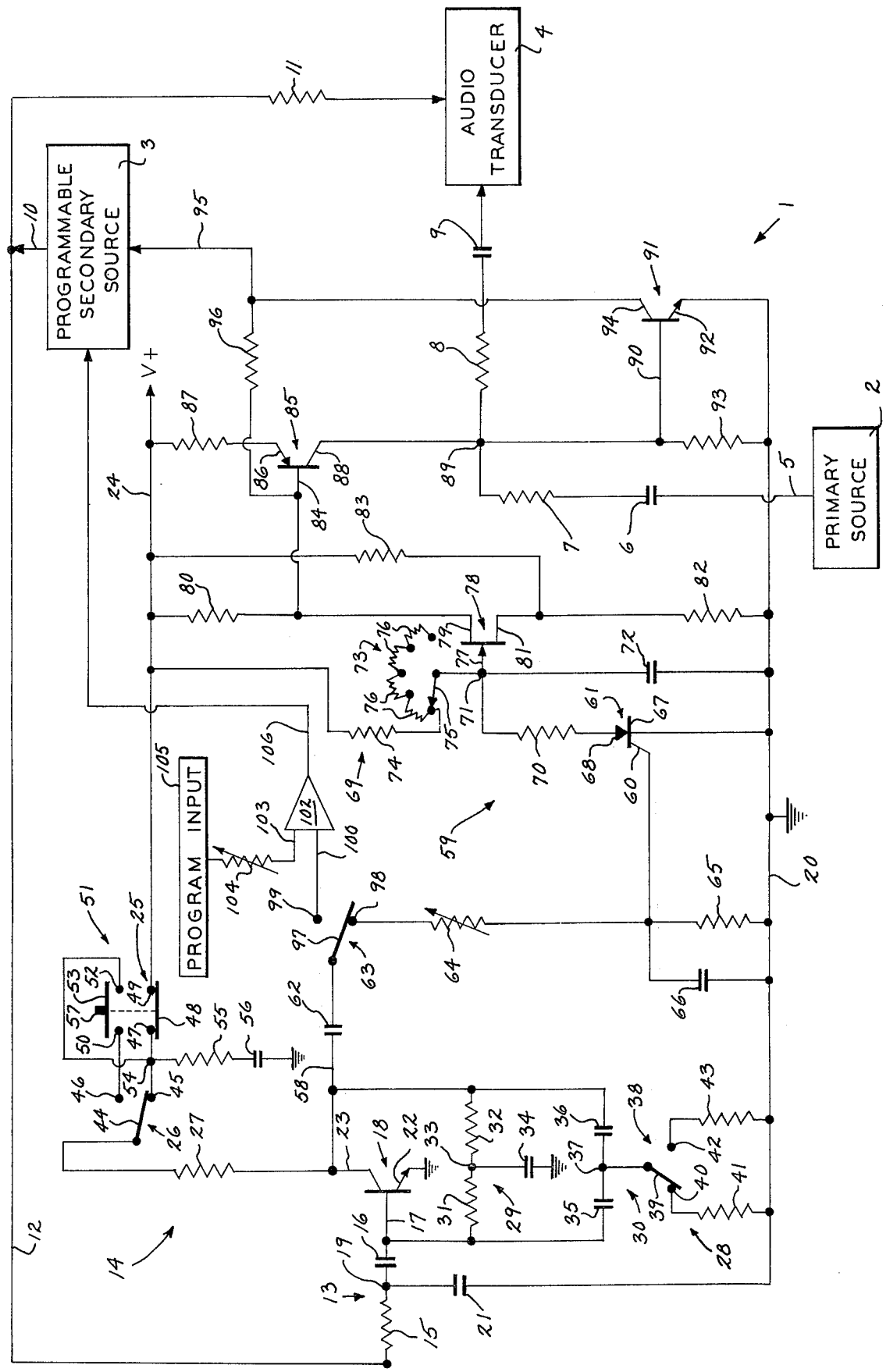

4,002,858

AUDIO PROGRAM SWITCHING APPARATUS

BACKGROUND OF THE INVENTION

This invention relates to an audio program control utilizing a control signal outside of the audio frequency range for controlling the operation.

Storage devices such as tape players can be readily programmed with audio frequency signals to furnish a program such as music, messages, etc., which are converted to audio sound waves through conventional speakers or the like.

Picture slide projectors have been utilized in conjunction with tape players to provide a simultaneous presentation of audio sound corresponding to the selected slide presentation, such as illustrated in the U.S. Pat. Nos. 3,420,966; 3,227,814; 3,200,206; 2,811,588; and 2,787,669. Many of such slide projectors are automatically operated by control signals generally outside of the audio frequency range which have been pre-programmed into the tape storage media for controlling the slide advance. Many of these systems employ control circuits having dual functioning elements which may be pre-conditioned to operate as a resonant or frequency selective amplifier for responding to such control signals for changing a picture slide or pre-conditioned to operate as an oscillator for selectively encoding a tape with a control signal having the desired frequency.

Teaching or instructional devices have also combined audio tape machines or recorders with slide or film projectors with the advance of such slides being controlled by frequency encoded control signals. One instructional device such as in the U.S. Pat. No. 3,664,037 a separate control channel in a multiple channel sound tape for supplying a high frequency film advance signal and a low frequency tape stop signal thus requiring a separate tape sensing head for sensing the control signals. Another instructional device such as in the U.S. Pat. No. 3,484,950 also employs a multiple channel tape system having a separate channel providing frequency control signals while at least one control signal is combined with audio signals and is sensed through filtering circuits for controlling the operation of the tape in combination with the control frequencies supplied from the separate control channel.

SUMMARY OF THE INVENTION

This invention relates to an audio program control which selectively operates a program storage in response to a control signal outside of the audio frequency range.

In one form of the invention, a primary source provides a continuous primary audio program while a secondary source provides a secondary audio program and a control signal outside of the audio frequency range. The primary and secondary sources are selectively and intermittently operated in response to the control signal so that the primary and secondary programs are appropriately supplied to a transducer for supplying such programs for audio listening. One practical application of the invention allows store owners and commercial proprietors to periodically interject their own pre-established announcements or commercial messages from the secondary source into continuously playing background music from the primary source.

A highly desirable control circuit includes a transfer means which responds to the control signal and initiates a timing sequence of a predetermined duration. A specially designed switching circuit responds to the timing sequence initiation and operatively supplies the primary output to the transducer for providing the primary program and further responds to the expiration of the predetermined duration of time and operatively supplies the secondary output to the transducer for providing the secondary program.

The invention thus provides a highly desirable control for providing intermittent and cyclic operation of two audio program sources. Such unique construction and operation includes a switching circuit having disconnect means which responds to the timing sequence initiation to operatively render the secondary program inoperative. Such disconnect means also responds to the expiration of the predetermined timing duration and operatively renders the primary program inoperative by attenuating the primary output.

The program transfer circuit includes a timing circuit utilizing an electrical storage unit which selectively receives a timing signal to initiate a timing sequence in response to the control signal. In a preferred embodiment, a selectively adjustable potentiometer supplies a timing signal from an electrical source to a storage capacitor. The impedance of the potentiometer is selectively pre-set and may be readily adjusted after installation by an inexperienced operator to select an appropriate timing interval and thus the timing duration. A timing initiation switch is also provided to operatively respond to the control signal for initiating a timing sequence by the supply of the timing signal to the storage capacitor. In a preferred embodiment, the initiation switch includes a controlled rectifier operatively responding to the control signal for rapidly discharging the storage capacitor and permitting a charging sequence upon cessation of the control signal. The timing sequence thus continues until the charge upon the storage capacitor reaches a predetermined magnitude which is sensed by a circuit including a field-effect type transistor for providing an output to control the switching between programs.

The invention also provides a highly desirable control signal sensing circuit which senses the secondary source output supplied upon a single storage channel and ignores the audio signals while selectively responding to the control signal in a highly desirable manner to control the transfer operation. A specially constructed amplifier includes a feedback containing a predetermined impedance selected to resonate the sensing circuit only in response to the control signal selected from a narrow band of frequencies while ignoring all other signals outside of the frequency band. Specifically, a twin-T negative feedback arrangement is used for providing a highly selective frequency discrimination between the control signal and other signals including the audio frequency signals.

Another highly desirable feature of the invention includes a selectively operable encoding circuit wherein the resonant amplifier is selectively modified with a second predetermined feedback impedance to oscillate the amplifying circuit to supply a control signal for recordation upon the program storage media. Such a recording circuit includes a selectively controllable source which provides an electrical input of a predetermined duration to oscillate the amplifying circuitry for supplying the desired control pulse at the period of time most appropriate according to the program being recorded upon the storage media. In a preferred embodiment, the selectively controlled source includes a storage capacitor selectively connected to the amplifying circuitry through a manually controlled switch or the like.

The invention thus provides a highly desirable control circuit which responds to control signals containing select frequencies which have been stored or recorded upon readily available commercial media such as cassette tape recorders or the like for controlling the operation of one or more audio programs. The control circuit has been specially designed to be keenly responsive in discriminating the control frequencies from other frequency signals existing upon the same channel including those of the audio program for providing reliable control. The preferred embodiment of the invention has been found highly desirable for cyclically controlling a secondary program supplying commercial messages or the like which are prepared and recorded by a store owner or the like upon a commercially available tape player. The appropriate control signals used for cyclic intervention are also readily encoded into the secondary source by an untrained operator for interjecting the secondary program into the continuously operating primary program. The control apparatus has been economically constructed to be compact and is easily operated by unskilled operators in a reliable manner.

BRIEF DESCRIPTION OF THE DRAWING

The drawing furnished illustrates the best mode presently contemplated by the inventor and clearly discloses the above advantages and features as well as others which will be readily understood from the detailed description thereof.

In the drawing:

FIG. 1 is an electrical circuit schematic and block diagrammatic view showing an electrical control coupling primary and secondary audio sources to an audio transducer.

DESCRIPTION OF THE PREFERRED ILLUSTRATED EMBODIMENT

The drawing illustrates a control circuit 1 connected to a primary audio source 2 and to a programmable secondary audio source 3 for selectively providing an output to an audio transducer 4. The primary audio source 2 could constitute any desired source of audio signals such as supplied from a radio, a tape recorder, a record player or any other suitable source which may include a commercial background music program frequently employed in commercial establishments.

The primary audio source 2 provides an output lead 5 connected to the audio transducer 4 through a series of electrical circuit including a capacitor 6, a resistor 7, a resistor 8 and a capacitor 9. The audio transducer 4 generally includes one or more speakers which convert the received electrical audio signals to sound waves and may also include additional circuits for amplification and regulation including distortion control if desired.

The programmable secondary audio source 3 provides an audio signal storage and may constitute a conventional tape player preferably of the cassette type which records audio signals or messages in a first mode of operation and selectively plays back such recorded messages in a second mode of operation.

The secondary audio source 3 provides an output at 10 connected through a resistor 11 to the audio transducer 4 so that recorded messages selectively played back by the secondary source 3 are converted from electrical signals to sound waves by the transducer 4. The output 10 of secondary source 3 is also connected through an electrical lead 12 to an input circuit 13 of a sensing and encoding circuit 14. The input circuit 13 includes a series connected resistor 15 and a D.C. blocking capacitor 16 connecting the input lead 12 to a base circuit 17 of an NPN type transistor 18. A junction circuit 19 connecting resistor 15 and capacitor 16 is coupled to a system ground lead 20 through a capacitor 21 functioning to provide circuit input protection against high frequency transient signals which might otherwise damage the transistor circuitry 18.

The transistor 18 further includes an emitter circuit 22 connected to the system ground 20 and a collector circuit 23 connected to a positive constant potential voltage source lead 24 through a normally closed switch 25, a switch 26 and a resistor 27.

The sensing and encoding circuit 14 includes a null type RC feedback network 28 which functions with the transistor 18 to selectively provide a twin-T negative feedback resonant amplifier/oscillator. Specifically, a pair of parallel connected feedback circuits 29 and 30 are connected between the base circuit 17 and the collector circuit 23. The circuit 29 includes serially connected resistors 31 and 32 having a junction circuit 33 connected to the system ground 20 through a capacitor 34 while the circuit 30 includes the serially connected capacitors 35 and 36 having a junction circuit 37 connected to the system ground 20 through a preselected impedance circuit 38. The circuit 38 includes an electrical switch 39 connected to the junction 37 and selectively operable to engage a first terminal 40 coupled to the system ground 20 through a resistor 41 and a second terminal 42 coupled to the system ground 20 through a resistor 43.

With switch 39 engaging terminal 40 as shown, the resistive circuit value of resistor 41 functions with the other components of circuitry 14 so that transistor 18 selectively operates as a resonant amplifier. In such an operating mode, an input signal appearing at lead 12 having a pre-selected frequency component of a narrow band width and sufficient magnitude is effective to resonant the circuit 14 and supply an A.C. output signal at the collector circuit 23. The sensing and encoding circuit 14 of the invention when operating as a resonant amplifier has been found to be insensitive to harmonics and accurately responds to the predetermined frequency band. With switch 39 engaging terminal 42, the circuit 14 is conditioned to operate as an oscillator having a predetermined frequency provided by the pre-selected electrical value of resistor 43 and the other circuit components. Such an oscillation sequence is initiated by the selective energization of the collector circuit 23 as will be described hereinafter.

The switch 26 includes an electrical switch arm 44 selectively movable between a pair of contacts 45 and 46. The contact 45 is connected to a contact 47 of the switch 25 which, in turn, provides a contactor 48. The switch 25 is normally in a closed condition to complete an electrical circuit between contacts 47 and 49. The contact 46 is connected to a contact 50 provided by a switch 51 which, in turn, provides a contact 52 and a normally open contactor 53. The contact 52 is electrically connected to a junction circuit 54 joining the contacts 45 and 47. The junction 54, in turn, is connected to the ground lead 20 through a series connected circuit including a resistor 55 and a capacitor 56. The normally closed contactor 48 and the normally open contactor 53 are connected to be mutually operated by a manual operator 57. The selective manual operation of push button 57 closes switch 51 and opens switch 25 to provide a programming control input signal of a predetermined duration to the programmable secondary audio source 3 as more fully described hereinafter.

The collector circuit 23 of transistor 18 is connected through an output circuit 58 to a switching control circuit 59. Specifically, lead 58 is connected to a gating circuit 60 of a thyristor 61 which may constitute a silicon controlled rectifier (SCR) through a D.C. blocking capacitor 62, a selectively operable switch 63 and a variable resistor 64. The gating circuit 60 is also connected to the system ground lead 20 through a parallel connected circuit including a resistor 65 and a capacitor 66. The thyristor 61 includes a cathode circuit 67 connected to the system ground lead 20 and an anode circuit 68 connected to a timing circuit 69 through a resistor 70.

The timing circuit 69 includes a junction circuit 71 connected to the system ground lead 20 through a capacitor 72 and to the positive potential lead 24 through a selectively variable timing potentiometer 73 and a fixed resistor 74. The timing potentiometer 73 includes a movable contact arm 75 for varied connection to a plurality of resistive elements 76 to provide a pre-selected operating impedance for potentiometer 73 and thus a desired time constant for the timing circuit 69. A highly desirable operation has been experienced by employing relatively large impedance values for the resistive elements 74 and 76. The junction circuit 71 is connected to a gate circuit 77 of a field-effect type switching transistor 78 having a drain terminal 79 connected to the source lead 24 through a resistor 80. A source terminal 81 of the field-effect transistor 78 is connected to the ground lead 20 through a resistor 82 and to the positive voltage lead 24 through a resistor 83 so that resistors 82 and 83 are interconnected in a voltage divider relationship.

The drain circuit 79 of transistor 78 is also connected to a base circuit 84 of a PNP type transistor 85 having an emitter circuit 86 connected to the positive voltage lead 24 through an attenuating resistor 87. A collector circuit 88 of the transistor 85 is connected to a junction circuit 89 connecting the resistors 7 and 8. The collector circuit 88 and the junction circuit 89 are also connected to a base circuit 90 of an NPN type switching transistor 91 having an emitter circuit 92 connected to the ground lead 20. The base circuit 90 is also coupled to the system ground lead 20 through a resistor 93 while a collector circuit 94 is connected through an output lead 95 to the secondary audio source 3. The collector circuit 94 of transistor 91 is also connected to the base circuit 84 of transistor 85 through a feedback circuit including a resistor 96.

The switch 63 includes a movable contact arm 97 which selectively engages a contact 98 connected to the variable resistor 64, as illustrated in the drawing. The contact arm 97 may be selectively moved to complete an electrical circuit with a contact 99 which, in turn, is connected to an input lead 100 of a recording amplifier 102. The amplfier 102 includes another input 103 connected through a variable resistor 104 to a programming input 105 which may consist of a tape player, a record player or any other suitable source of electrical audio signals and may include a microphone if desired. An output lead 106 provided by amplifier 102 is connected to supply an input to the programmable secondary audio source 3.

In one preferred mode of operation, the primary audio source 2 is connected to continuously supply audio frequency electrical signals carrying desirable information or music at the output lead 5 which is conducted through the capacitor 6; resistors 7 and 8 and capacitor 9 to the audio transducer 4 for producing sound waves to be detected by a human ear. Assuming that the manual switches are in the positions illustrated in the drawing and that the thyristor 61 is rendered non-conductive, the capacitor 72 begins charging through a circuit including the positive voltage source lead 24, the resistor 74 and the variable potentiometer 73. When charged to a predetermined magnitude, the charge stored by capacitor 72 operates through gate 77 to "turn-on" the field-effect transistor 78 and operatively supplies a signal to the base circuit 84 to render transistor 85 conductive or "turned-on". The attneuating resistor 87 provides a relatively low impedance and operatively attenuates the primary audio signal supplied to junction circuit 89 from source 2 so as to be of insufficient magnitude to drive the audio transducer 4. In other words, the conduction of transistor 85 operatively prevents any significant response by the audio transducer 4 to the signals supplied by the primary audio source 2.

The "turning-on" or conduction of transistor 85 also operatively supplies an input signal to the base circuit 90 to turn-on and render transistor 91 conductive. The turning-on of transistor 91 operatively supplies an output signal through lead 95 to turn-on or activate the secondary audio source 3. The positive feedback provided through resistor 96 provides a fast acting and reliable response to ensure a complete switching sequence. In one contemplated mode of operation, the turning-on of transistor 91 is effective to start a tape recorder provided by the secondary audio source 3 for supplying an audio output at 10 which is converted by the audio transistor 4 into sound waves to be detected by a human ear. In one contemplated sequence, a taped commercial message provided by the secondary source 3 is used to interrupt continuous music provided by the primary source 2.

The output of the secondary audio source 3 as at 10 is also supplied through lead 12 to the sensing and encoding circuit 14 through the input circuit 13. With contact arm 39 of switch 38 connected to contact 40, the circuit 14 is preconditioned to operate as a resonant amplifier. Thus, the electrical characteristics of the feedback circuit 28 are selected so that the resonant amplifier 14 will only respond to signals appearing at lead 12 which are within a narrow band of frequencies and have sufficient magnitude for operating the transistor 18. In a preferred construction, the components are selected so that the amplifier 14 resonates in response to a narrow frequency range either well below or well above the audio frequencies generally associated with the sound response range of a human ear.

The audio signals provided by a prescribed program supplied by the secondary audio source 3 thus has no effect upon the resonant amplifier 14. When such a prescribed program has completed, a control signal or pulse having a pre-selected frequency either above or below the audio range is supplied by the secondary source 3 to resonate the amplifier 14 when supplied to the base circuit 17 through lead 12. The resonant output of amplifier 14 appearing at lead 58 is above a predetermined magnitude which renders the controlled rectifier 61 conductive thereby rapidly discharging capacitor 72 to render the field-effect transistor 78 non-conductive. The turning-off of transistor 78 operatively supplies an output to the base circuit 84 and renders the transistor 85 non-conductive.

The turning-off of transistor 85 operatively removes the attenuating resistor 87 from junction 89 and thus the attenuation to the primary audio signal supplied from source 2 and reinstates the primary audio program at the audio transducer 4. The non-conduction of transistor 85 also supplies a signal to the base circuit 90 to render the transistor 91 non-conductive which, in turn, supplies a turn-off de-activation output signal at lead 95 to disable the secondary audio source 3. It is contemplated that the de-activation signal supplied to secondary source 3 could operatively rewind a tape reel or provide any other type of resetting sequence to condition the secondary program at source 3 for another cycle of operation.

The discontinuance of the control pulse supplied by the secondary source 3 at the termination of the secondary program turns-off the resonant amplifier 14 to correspondingly remove the gating signal from the controlled rectifier 61. The rapid discharge of the capacitor 72 sufficiently removes voltage from the anode 68 and the removal of the gate signal from the gate terminal 60 renders the thyristor 61 non-conductive or turned off. The capacitor 72 thus starts to charge to initiate another timing cycle. The duration of time between primary program interruptions is determined by the pre-selected time constant of the timing circuit 69 and may readily be adjusted through the manual positioning of the contact arm 75.

The invention also provides a highly desirable circuit for transcribing and programming the secondary audio source 3 with pre-selected audio and control signals for selective use in the sequence described above. Such an encoding sequence is readily provided by transferring switch arm 44 to contact 46, switch arm 39 to contact 42 and switch arm 97 to contact 99. The connection of resistor 43 effectively pre-conditions the circuit 14 to operate as an oscillator. The program input 105 is activated to supply pre-selected audio signals through the amplifier 102 for storage within the secondary audio source 3.

At the completion of the program or message supplied from input 105, the switch 57 is manually operated to close switch 51 and open switch 25 to disconnect the positive voltage lead 24 and discharge capacitor 56. The signal provided by the capacitor 56 through switch 51 operatively permits the circuit 14 to oscillate at the pre-selected frequency. The oscillating control pulse duration is limited by the charge maintained by capacitor 56 so that continued operation of the manual operator 57 will only provide a pulse at lead 58 of predetermined limited time duration. The control pulse is supplied through switch 63 and super-imposed at the recording amplifier 102 with the program supplied from input 105. The control pulse supplied by switch 51 and the pre-selected program supplied from input 105 are thus stored and maintained by the secondary audio source 3.

The circuit is readily pre-conditioned for providing a playback operation by the simple transfer of the switch arms 39, 44 and 97 to the positions as illustrated in the drawing while it is understood that such switches could be interconnected for simultaneous operation by a single operator. The pre-recorded control pulse having a frequency either above or below the audio range is thus effective for actuating the resonant amplifier 14 to de-activate the operation of the secondary audio source 3 and reinstate the program of the primary audio source 2 as previously described.

It is further contemplated that the secondary audio source 3 could desirable include a plurality of pre-selected programs retained either on a single storage or on a plurality of storages each containing separate audio programs which are segregated by a plurality of pre-selected control pulses each having a different frequency. In such a contemplated operation, a plurality of resonant amplifiers/oscillators 14 would be parallel connected for providing a plurality of control channels which receive the input at lead 12 for selective operation by the control pulses. Each such channel would be designed to respond to an individualized frequency corresponding to such channel which resonates the corresponding discriminating amplifier for operatively turning off the secondary audio source 3 and initiating a timing sequence for the timing circuit 69. The timed energization or conduction of the transistor 78 thus initiates operation of succeeding or alternate programs according to the designed logic within the secondary audio source 3. Such command frequencies could be utilized singularly in sequence or simultaneously for multiple control with such command frequencies stored in a common media.

The invention thus provides a highly desirable control system which may be utilized with commercial music type systems wherein background music provided by a primary audio source is broadcast within a commercial establishment or the like and is periodically interrupted for the insertion of commercial messages provided by the commercial establishment. The invention also provides a convenient and versatile system which may be used for programming desirable commercial messages by business proprietors having little experience in program formulations.

Various modes of carrying out the invention are contemplated as being within the scope of the following claims particularly pointing out and distinctly claiming the subject matter which is regarded as the invention.

I claim:

1. An electrical control apparatus, comprising a transducer converting electrical audio signals to audio sound waves, a primary source connected through a connecting circuit to said transducer and supplying a primary output including a continuous primary audio program, a secondary source connected to said transducer and selectively supplying a secondary output including a secondary audio program of a predetermined time duration followed by a control signal outside of the audio frequency range, an amplifying transistor connected in common emitter configuration and having a base circuit connected to receive said secondary output and a collector circuit operatively connected to a power source, a feedback coupling said collector and base circuits and including a first feedback path having a first resistor and a first circuit portion connected to a system ground potential through a first capacitor and a second feedback path having a second capacitor and a second circuit portion connected to said ground potential through a second resistor, said amplifying transistor resonating in response to said control signal to provide a resonating output at said collector circuit, a controlled rectifier having a gating circuit operatively connected to said collector circuit and an anode circuit providing an output in response to said resonating output, a timing circuit including a selectively variable impedance operatively connected to said power source and to a timing capacitor through a junction circuit connected to said anode output circuit, said timing circuit responding to said controlled rectifier and initiating a timing sequence of a predetermined time in response to said resonating output, a first switching circuit connected to said junction circuit and providing an output connected to said connecting circuit and operatively supplying said primary program to said transducer in response to said timing sequence initiation and operatively attenuating said primary program in response to the expiration of said predetermined time, and a second switching circuit connected to said first switching output and to said secondary source and operatively supplying said secondary output to said transducer and to said amplifying transistor in response to the expiration of said predetermined time.

2. The control apparatus of claim 1, wherein said first switching circuit includes a field-effect transistor having a gate circuit connected to said junction circuit and a drain circuit operatively connected to a base circuit of a first switching transistor having an output circuit connected to said connecting circuit and selectively attenuating said primary program, said second switching circuit including a second switching transistor having a base circuit connected to said first transistor output circuit and having an output circuit connected to said secondary source.

3. The control apparatus of claim 1, and including a recording circuit connecting an originating program source to said secondary source and selectively supplying said secondary audio program for storage by said secondary source, a first switch selectively connecting said collector output circuit to said recording circuit, a second switch selectively operable and varying the impedance between said second circuit portion and said ground potential and pre-conditioning said amplifying transistor for free-running oscillation, and a third switch selectively operable between a first position connecting a storage capacitor to said power source and a second position connecting said storage capacitor to said collector circuit and operatively oscillating said amplifying transistor and selectively providing said control signal to said recording circuit for storage by said secondary source.

4. The control apparatus of claim 3, and including a transfer switch connected to said collector circuit and selectively operable between first and second transfer contacts, said third switch including a manual operator coupled to a first set of normally closed contacts connecting said first transfer contact and said storage capacitor to said power source and a second set of normally open contacts connecting said storage capacitor to said second transfer contact.

* * * * *